(12) United States Patent
Feero

(10) Patent No.: US 8,886,491 B2
(45) Date of Patent: Nov. 11, 2014

(54) AUTO-CALIBRATING WHEEL BALANCER FORCE TRANSDUCER

(75) Inventor: William B. Feero, St. Louis, MO (US)

(73) Assignee: Hunter Engineering Company, St. Louis, MO (US)

( * ) Notice: Subject to any disclaimer, the term of this patent is extended or adjusted under 35 U.S.C. 154(b) by 639 days.

(21) Appl. No.: 13/095,168

(22) Filed: Apr. 27, 2011

(65) Prior Publication Data

US 2011/0270564 A1    Nov. 3, 2011

Related U.S. Application Data

(60) Provisional application No. 61/330,084, filed on Apr. 30, 2010.

(51) Int. Cl.
*G01B 21/26* (2006.01)
*G01L 25/00* (2006.01)

(52) U.S. Cl.
CPC .................................. *G01L 25/00* (2013.01)
USPC ............................ 702/151; 702/105; 702/152

(58) Field of Classification Search
USPC ........ 73/1.15, 1.48, 35.11, 35.13, 462.1, 657; 702/90, 104, 105, 106
See application file for complete search history.

(56) References Cited

U.S. PATENT DOCUMENTS

| | | | |
|---|---|---|---|
| 4,093,885 A * | 6/1978 | Brown | 310/331 |
| 4,250,555 A | 2/1981 | Mitchell et al. | |
| 4,441,355 A | 4/1984 | Rothamel | |
| 5,033,302 A | 7/1991 | Monch | |
| 5,542,294 A * | 8/1996 | Douglas | 73/462 |
| 6,338,199 B1 * | 1/2002 | Chigira et al. | 33/318 |
| 7,043,396 B2 * | 5/2006 | Larson et al. | 702/151 |
| 7,183,937 B2 * | 2/2007 | Park et al. | 340/693.1 |
| 7,328,124 B2 * | 2/2008 | Voeller | 702/151 |
| 7,328,614 B2 * | 2/2008 | Gerdes et al. | 73/461 |
| 7,755,251 B2 * | 7/2010 | Kudo | 310/317 |
| 2003/0005764 A1 * | 1/2003 | Colarelli et al. | 73/462 |
| 2004/0251778 A1 * | 12/2004 | Hoshino | 310/317 |
| 2008/0173102 A1 * | 7/2008 | Nehl et al. | 73/862.333 |
| 2011/0283768 A1 * | 11/2011 | Peczalski | 73/1.82 |

* cited by examiner

*Primary Examiner* — Sujoy Kundu
*Assistant Examiner* — Corey Bailey
(74) *Attorney, Agent, or Firm* — Polster, Lieder, Woodruff & Lucchesi, L.C.

(57) ABSTRACT

A method and apparatus for carrying out auto-calibration of one or more piezoelectric elements in a force transducer assembly of a vehicle wheel balancing system. Output electrical signals from the piezoelectric transducers in response to application of a known imbalance force are measured and recorded. Subsequently, during an auto-calibration procedure, a known input signal is selectively applied to at least one piezoelectric element in the force transducer assembly, and at least one output electrical signal is received from the force transducer assembly. The obtained auto-calibration output signals are evaluated with respect to the output signals obtained from a previous auto-calibration, and compensation values are derived there from for application to subsequent output signals obtained during imbalance measurements.

17 Claims, 3 Drawing Sheets

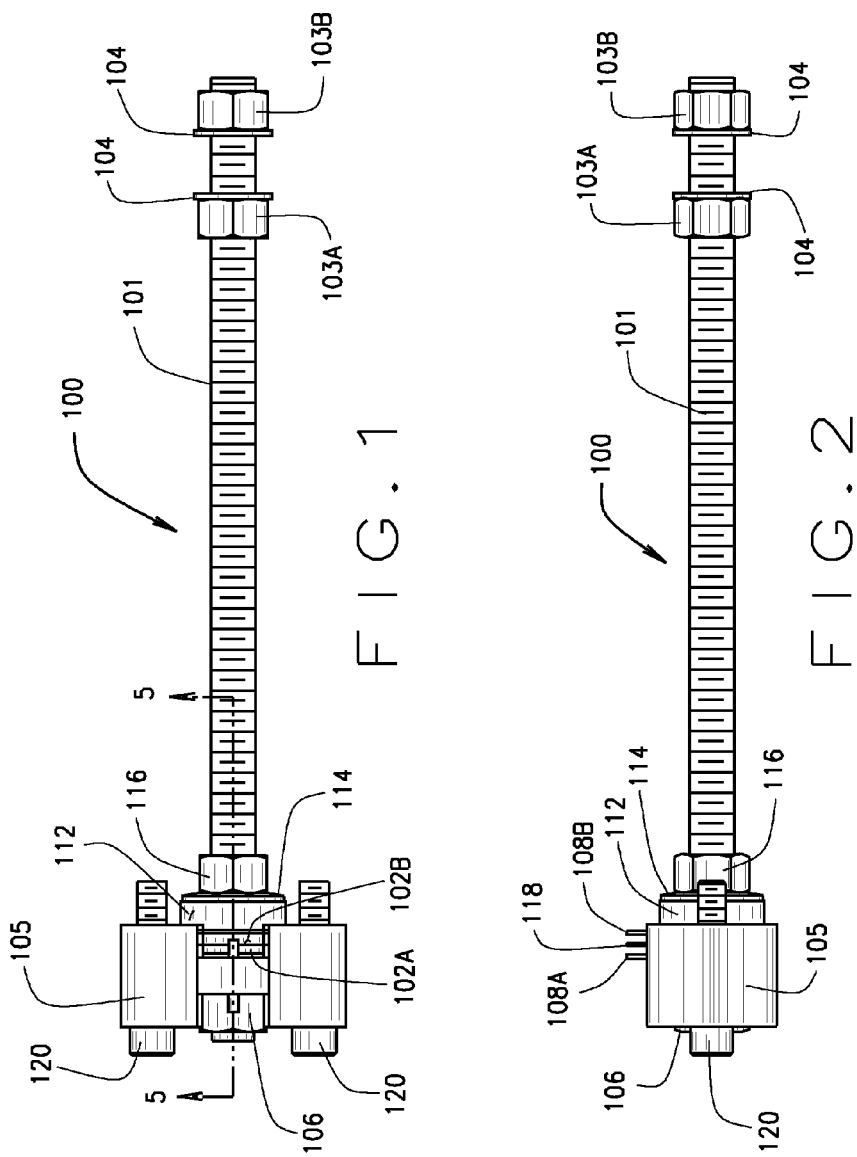

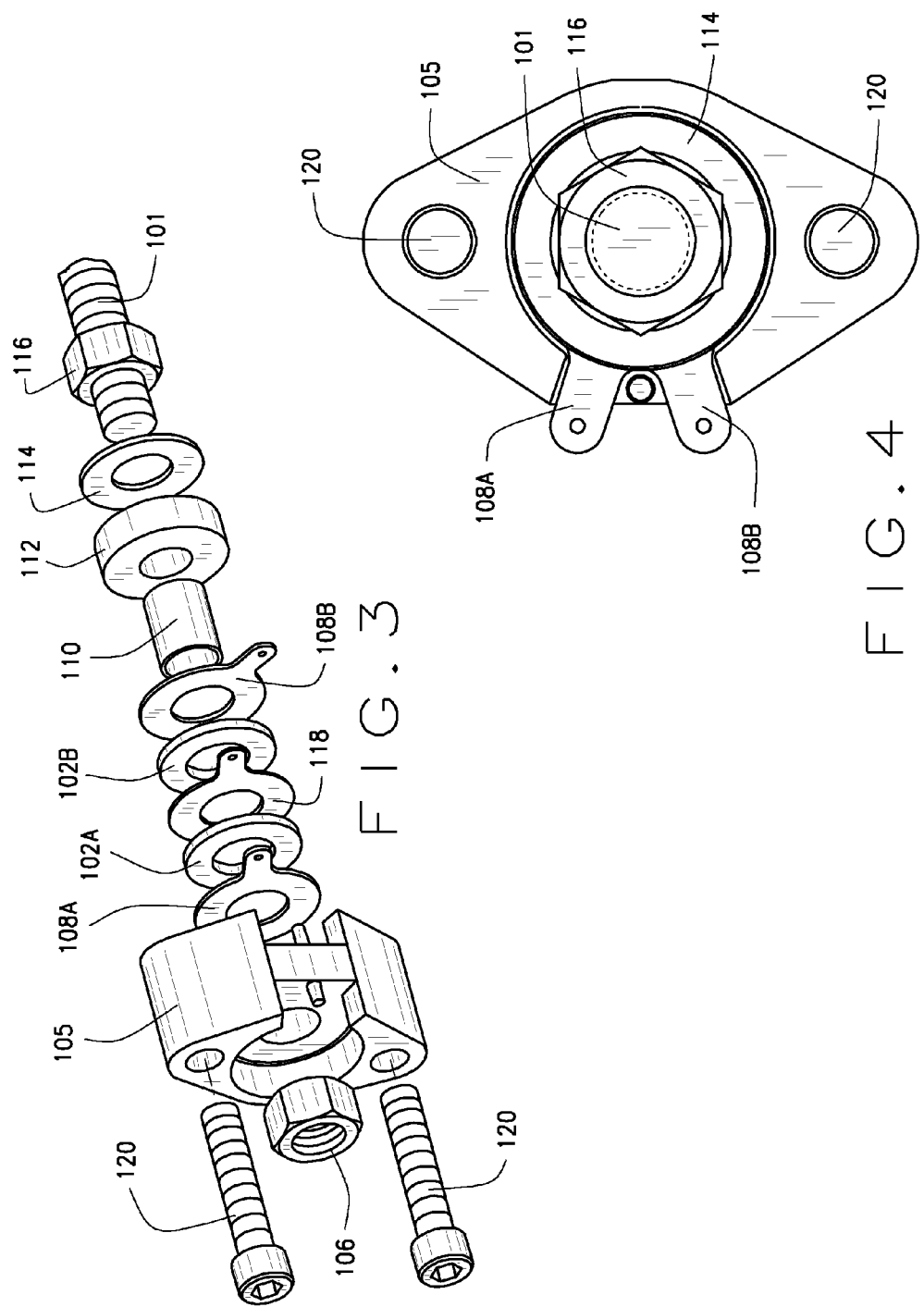

AUTO-CALIBRATING WHEEL BALANCER FORCE TRANSDUCER

CROSS-REFERENCE TO RELATED APPLICATIONS

The present application is related to, and claims priority from, U.S. Provisional Patent Application Ser. No. 61/330,084 filed on Apr. 30, 2010 to Feero for "Auto-Calibrating Wheel Balancer Force Transducer", which is herein incorporated by reference.

STATEMENT REGARDING FEDERALLY SPONSORED RESEARCH

Not Applicable.

BACKGROUND OF THE INVENTION

The present invention is related generally to force transducers utilized in vehicle wheel balancing systems to measure imbalance forces in a rotating body, and in particular, to a force transducer for a vehicle wheel balancing system incorporating a automatically calibrating piezoelectric force transducer.

The determination of imbalance in vehicle wheel assemblies is generally carried out by an analysis of the vehicle wheel assembly with reference to phase and amplitude of any mechanical vibrations caused by a rotation of the unbalanced masses present in the vehicle wheel assembly. These mechanical vibrations are measured as motions, forces, or pressures by means of transducers, which convert the mechanical effects to electrical signals. Each signal is the combination of fundamental oscillations caused by imbalance and noise.

Generally, vehicle wheel balancing systems include a shaft adapted for receiving a vehicle wheel assembly, capable of being rotationally driven about a longitudinal axis so as to rotate a vehicle wheel assembly which is removably mounted thereon. A rotation sensor assembly is provided for measuring rotation of the shaft about the longitudinal axis, and various force transducers are operatively connected to the shaft for measuring the mechanical vibrations resulting from the rotating imbalances in the vehicle wheel assembly. A control circuit regulates the driven rotation, and determines, from signals representative of the mechanical vibrations measured by the force transducers, any required imbalance correction weight amounts and placement locations on the vehicle wheel assembly necessary to correct any measured vibrations resulting from the imbalances present in the vehicle wheel assembly.

Typically a vehicle wheel balancer contains two force transducers which sense the mechanical vibrations as imbalance forces during a rotation of a vehicle wheel assembly on the shaft. These force transducers are usually based on ceramic piezoelectric devices that generate an electrical voltage output in an amount proportional to the force applied to the devices. The electrical voltage is then read by the control circuit of the balancer electronics, enabling computation of an imbalance value for the vehicle wheel assembly.

The output of piezoelectric devices change with time, temperature, preload, and load history. Compensating for these changes requires the user to perform periodic manual calibration procedures to ensure continued accuracy. Most vehicle wheel balancers require this periodic calibration procedure to be performed. Failure on the part of an operator to perform the required periodic calibrations, or improper calibrations, can result in errors in determining the imbalance condition of a vehicle wheel assembly, leading to the incorrect application of imbalance correction weights, repeated attempts to balance ("chase spins") the vehicle wheel, and at worst, unsatisfied customers ("comebacks").

Accordingly, it would be advantageous to provide a vehicle wheel balancing system with a force transducer assembly which does not require the operator to periodically perform a manual calibration procedure, thereby eliminating the need to remind an operator for periodic calibrations, and reducing the opportunity for the introduction of operator errors.

BRIEF SUMMARY OF THE INVENTION

Briefly stated, the present disclosure provides a vehicle wheel balancer system with a force transducer assembly incorporating a plurality of automatically calibrating piezoelectric elements for generating signals representative of imbalance present in a rotating vehicle wheel assembly under test.

As a method, the present disclosure provides for automatic calibration of two or more of piezoelectric elements in a force transducer assembly of a vehicle wheel balancing system. Output signals representative of voltage and phase generated by the piezoelectric elements within the force transducers in response to application of a known imbalance force are measured and recorded. Subsequently, during an automatic calibration, a known input signal is selectively applied to one piezoelectric element in the force transducer, and an output voltage and phase relative to the input signal are measured on a second piezoelectric element in the transducer assembly. Next, the signals to and from the piezoelectric elements are switched, and the measurement step is repeated to obtain output values for the first piezoelectric in the transducer assembly. The obtained automatic calibration output signals are evaluated with respect to the output signals obtained during a previous calibration or with respect to the output signals obtained during the known imbalance force test, and compensation values are derived for application to new output signals obtained during subsequent imbalance measurements.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1 is a top plan view of a force transducer assembly of the present disclosure;

FIG. 2 is a side plan view of the force transducer assembly of FIG. 1;

FIG. 3 is an exploded perspective view of the force transducer assembly of FIG. 1;

FIG. 4 is an end plan view of the force transducer assembly of FIG. 1;

Corresponding reference numerals indicate corresponding parts throughout the several figures of the drawings. It is to be understood that the drawings are for illustrating the concepts set forth in the present disclosure and are not to scale.

Figure 5:
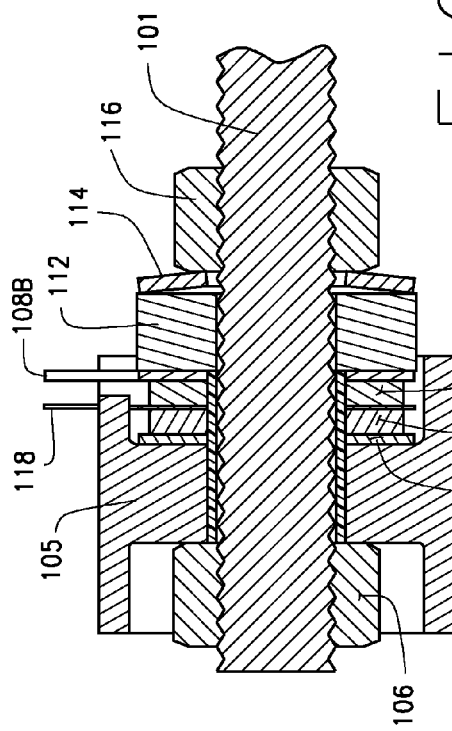
FIG. 5 is a sectional view taken at A-A in FIG. 1.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Generally, a vehicle wheel balancing system configured to utilize the auto-calibrating force transducers assembly 100 of the present disclosure includes conventional balancer components, such as a rotationally driven shaft adapted for receiving a vehicle wheel assembly, a drive motor, and a processing system for controlling the drive motor and handling various balancer procedures and calculations. A rotation sensor assembly is generally provided for measuring rotation of the shaft about its longitudinal axis, and a plurality of auto-calibrating force transducers 100 are operatively coupled to the shaft for measuring the mechanical vibrations resulting from imbalance in the vehicle wheel assembly. The processing system regulates the driven rotation and determines, from mechanical vibrations of the mounted vehicle wheel assembly measured by the auto-calibrating force transducers, any required imbalance correction weight amounts and placement locations on the vehicle wheel assembly necessary to correct any measured vibrations resulting from imbalances present in the vehicle wheel assembly.

Preferably, the vehicle wheel balancer contains at least two auto-calibrating force transducers 100 which sense the mechanical vibrations as imbalance forces during a rotation of the vehicle wheel assembly on the balancer shaft and produce a associated output signal. These auto-calibrating force transducers 100 may be based on piezoelectric devices, such as piezo ceramics, that generate an electrical voltage output signal in an amount proportional to the applied force, or on other suitable sensors, such as magnetostrictive sensors that produce magnetic output signals in an amount proportional to the applied force via the Villari effect. The resulting output signals are interpreted by the control circuit of the vehicle wheel balancer electronics, enabling computation of an imbalance value for the vehicle wheel assembly. The present disclosure provides both methods and apparatus which uniquely exploit another properties of a piezoelectric and magnetostrictive device as an auto-calibrating force transducer. Essentially, a piezoelectric device can also generate a force if a voltage is applied to it, by expanding or contracting in response to the sense of the voltage, while a magnetostrictive device can generate a force if a magnetic field is applied to it, by expanding or contracting in response to the strength of the field.

The present disclosure is described with the use of exemplary piezoelectric sensors, however, those of ordinary skill in the art will readily recognize that the concepts disclosed herein may be adapted for use with other types of sensors, such as magnetostrictive sensors, which operate to provide an output signal in response to a force, and which generate a force in response to an input signal. There are many types of suitable piezoelectric materials available for use as auto-calibrating force transducers in a vehicle wheel balancer system. Piezo ceramic materials are commonly used as they provide good performance for a reasonable cost. While the present disclosure is described generally in the context of a vehicle wheel balancer system employing piezo ceramic materials as force transducers, those of ordinary skill in the art will recognize that other piezoelectric materials may be utilized without departing from the scope of the invention, if the equations disclosed herein are modified to accommodate the specific parameters associated with the material being utilized.

In general, piezoelectric elements such as piezo ceramics, behave according to the following equations:

$$V_{out} = g * t * \frac{F}{A} \qquad \text{Eqn. (1)}$$

where $V_{out}$ is the output voltage generated by the piezoelectric element;
g is the voltage coefficient (a parameter of the piezoelectric element);
t is the thickness of the piezoelectric element;
F is the force applied to the piezoelectric element; and
A is the surface area of the piezoelectric element.

A change in the thickness Dt of the piezoelectric element due to an applied voltage can be expressed as:

$$Dt = d * V_{in} \qquad \text{Eqn. (2)}$$

where d is the charge coefficient (a parameter of the piezoelectric element), and $V_{in}$ is the applied voltage.

The charge coefficient (d) of the piezoelectric element can be further expressed as:

$$d = K * E * g \qquad \text{Eqn. (3)}$$

where K represents the dielectric constant (a parameter of the piezoelectric element), and E represents the dielectric constant of free space. Alternatively, the capacitance C of the piezoelectric element can be expressed as:

$$C = K * E * \frac{A}{t} \qquad \text{Eqn. (4)}$$

Each piezoelectric element has four parameters (d, g, C, and K) that change during the lifespan of the piezoelectric element. Two of these parameters are independent.

Turning to the figures, and to FIGS. 1-4 in general, an exemplary embodiment of an auto-calibrating force transducer assembly 100 of the present disclosure is illustrated for use in a vehicle wheel balancer system by coupling between a vibrating component such as a support member for the rotating shaft, and a stationary component such as a housing or frame of the balancer. The auto-calibrating force transducer assembly 100 is shown as assembled axially on a threaded rod 101 adapted for fitment between the stationary and vibrating components. A pair of mounting nuts 103A and 103B, together with associated washers 104 are threaded to a first end of the threaded rod 101 for coupling to one component of the balancer. At the second and opposite end of the threaded rod 101, the pair of piezoelectric elements 102A and 102B are mounted coaxially about the threaded rod 101 against an a first axial face of an assembly body 105. The assembly body 105 is coaxially disposed about the threaded rod 101 adjacent to the second end. A retaining nut 106 abuts the second axial face of the assembly body 105, and secures the assembly body 105 against axial movement towards the second end of the threaded rod 101.

Each piezoelectric element 102 has an annular shape, and is paired is an associated annular circuit board 108 for axial mounting on the threaded rod 101 adjacent to the first axial face of the assembly body 105, as best seen in FIG. 3 and FIG. 5. Electrical signals to and from each piezoelectric element are passed through electrical contacts with the associated annular circuit boards 108, and accordingly, each piezoelectric element is electrically isolated from the threaded rod 101 by an insulating sleeve 110 which extends coaxially through the assembly body 105. Each associated annular circuit board 108 further includes an connecting tab 108T for communicating input and output signals to external components, such as a controller or processor. The piezoelectric elements 102 and associated annular circuit boards 108 are secured against the first axial face of the assembly body 105 with an annular spacer 112, a preload element 114, and a second retaining nut 116 threaded onto the threaded rod 101.

In the embodiment shown in FIG. 3 and FIG. 5, the components are assembled onto the threaded rod 101 in the following order:

First, the second retaining nut 116 is threaded part-way along the length of the threaded rod 101 from the second end. Next, a preload element 114, in the form of a Belleville washer is placed on the threaded rod 101 from the second end, and positioned against the second retaining nut 116. A suitable annular spacer 112 is next placed on the threaded rod 101 from the second end, and moved into contact with the preload element 114. The insulating sleeve 110 is slid onto the threaded rod 101 from the second end and moved into contact with the annular spacer 112. A first annular circuit board 108B is fitted onto the threaded rod and disposed coaxially about the insulating sleeve 110, against the axial face of the annular spacer 112, and a first piezoelectric element 102B is similarly slid into position, coaxially about the insulating sleeve and in abutting axial contact with the first annular circuit board 108B. An insulating annular spacer 118 with a tab is next positioned onto the threaded rod to provide electrical insulation between adjacent piezoelectric elements 102, and moved into contact with the exposed axial face of the first piezoelectric element 102B. The second piezoelectric element 102A is then positioned on the threaded rod 101, followed by the associated second annular circuit board 108A. The assembly body 108 is then placed axially onto the second end of the threaded rod 101, and the retaining nut 106 threaded onto the second end of the threaded rod 101. The entire collection of components is then axially compressed by threading the second retaining nut 116 axially towards the second end of the threaded rod 101, until the preload element 114 is compressed against the annular spacer 112 with a desired amount of force. Finally, the assembled auto-calibrating piezoelectric transducer 100 may be secured between a vibrating component and a stationary component of the wheel balancer by the pair of mounting nuts 104 adjacent to the first end of the threaded rod 101, and by a pair of mounting screws 120 passing through the assembly body 105.

Preferably, the vehicle wheel balancer system includes at least two auto-calibrating force transducer assemblies 100, each containing two or more piezoelectric elements 102A and 102B. In the described exemplary embodiment the piezoelectric elements 102 are annular ring shaped, but other shapes, such as circular discs, may be utilized without departing from the scope of the present disclosure.

During a balance spin, the associated electronics and processing system of the vehicle wheel balancer system will receive an electrical signal $E_{out}$ representative of the voltage output from each of the piezoelectric elements 102A, 102B on each auto-calibrating transducer assembly 100 to calculate an imbalance present in the body (such as a vehicle wheel assembly) mounted to the balancer rotating shaft.

Before the vehicle wheel balancer system is initially used, a manual force calibration procedure is performed by the user. This calibration procedure requires rotating the balancer shaft with a known calibration weight amount attached thereto, and calibrating the resulting output signals from the auto-calibrating transducer assemblies 100 to the known imbalance of the calibration weight amount. Following the force calibration procedure, a self- or auto-calibration is carried out to establish a baseline for the piezoelectric parameters to be used in subsequent auto-calibrations during the future use of the vehicle wheel balancer system. The auto-calibration procedure is described below. After the initial auto-calibration is completed, no additional manual force calibration procedures are required for the vehicle wheel balancing system unless a service has been performed on the vehicle wheel balancing system which alters one or more components.

The piezoelectric elements 102A, 102B in the auto-calibrating transducer assemblies 100 are mechanically coupled such that if a voltage is applied to one piezoelectric element 102A or 102B, it will expand or contract, causing a force to be applied to, and a voltage to be generated by, the opposite or remaining piezoelectric elements 102A or 102B within the same auto-calibrating transducer assembly 100. During auto-calibration, a known input signal is selectively applied to one piezoelectric element 102A or 102B, and an output voltage and phase relative to the input signal are measured on the one or more remaining piezoelectric elements 102A or 102B in the same auto-calibrating transducer assembly 100. The process is preferably repeated for each piezoelectric element 102A and 102B in the auto-calibrating transducer assembly 100, and for each auto-calibrating transducer assembly 100 in the vehicle wheel balancer system.

However, it will be recognized that it may be assumed that each piezoelectric element 102A and 102B in an auto-calibrating transducer system 100 will drift and age similarly, and will exhibit similar response characteristics to an input signal, enabling a "quick" calibration process to be carried out using only the response signals at each piezoelectric element 102A and 102B resulting from the application of a single input signal to just one piezoelectric element 102A or 102B, avoiding the need to provide an input signal to each individual piezoelectric element 102A and 102B. Similarly, a single piezoelectric element 102 in an auto-calibrating transducer system 100 having multiple piezoelectric elements may be designated as a "calibration element" and utilized only for purposes of receiving the auto-calibration input signals.

The results of each subsequent auto-calibration procedure are compared to the results of the previously preformed auto-calibration procedure, and optionally to the results of the initial force calibration procedure. The comparison and resultant calculations yield a correction factor for both the amplitude and the phase of each auto-calibrating transducer assembly electrical output signal $E_{out}$ that are subsequently applied to the imbalance measurements of a body, such as a vehicle wheel assembly, mounted to the balancer rotating shaft.

The self- or auto-calibration procedures are transparent to the user of the vehicle wheel balancing system. The procedures may be automated by the vehicle wheel balancer processing system, occur very fast, and can be done any time the vehicle wheel balancer system is not in use. Alternatively, if the calibration signal frequency is significantly different than the balance spin frequency, the auto-calibration process may be carried out continuously by the vehicle wheel balancer processing system, even during use.

Self- or auto-calibration procedures may be utilized to compensate for temperature and force changes, and the resulting effects on the electronics and mechanical structure of the vehicle wheel balancer system. The auto-calibration procedure is not affected by the presence or absence of a wheel or tire assembly mounted on the balancer. Similarly, a change in position of the vehicle wheel balancer system on the floor, or a previous action of an associated load roller or other forces will not affect the results of the auto-calibration procedure.

In an optional embodiment, auto-calibration may be carried out between the piezoelectric elements 102A and 102B in separate auto-calibrating transducer assemblies 100 by applying a large voltage signal to the piezoelectric elements 102A and 102B in one auto-calibrating transducer assembly and measuring the output voltage at the piezoelectric elements 102A and 102B in a separate auto-calibrating transducer assembly 100 present in the vehicle wheel balancer system. Preferably, very thick piezoelectric elements 102 capable of handling very large input voltages are utilized. However, using this method of auto-calibration with single piezoelectric elements 102, the auto-calibrating transducer assemblies 100 would be susceptible to vibration structure dynamics, and hence the auto-calibration result would be different if a vehicle wheel was mounted on the vehicle wheel balancer shaft at the time of the auto-calibration procedure.

Figure 6:
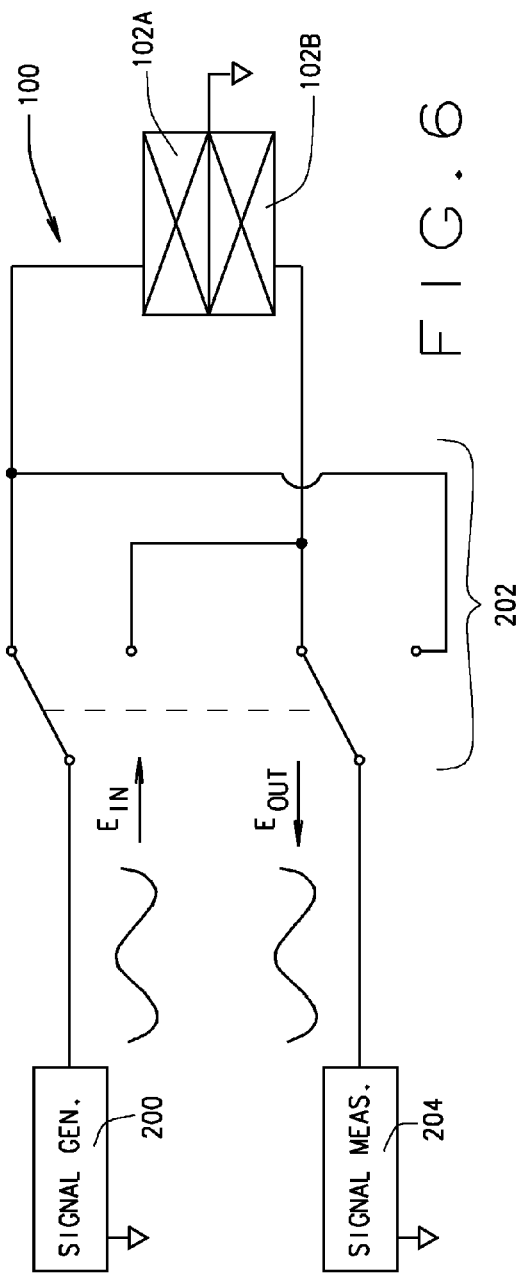
FIG. 6 is a simplified circuit diagram illustrating the electronic components of the force transducer assembly of the present disclosure.

Turning to FIG. 6, an auto-calibration procedure of the present disclosure is illustrated generally for a pair of piezoelectric elements in a balancer transducer assembly. A signal source 200 with a known frequency and amplitude is utilized to generate an electrical input signal $E_{in}$ for application to either piezoelectric element 102A or 102B in an auto-calibrating transducer assembly 100 via a switching network 202. Additionally coupled to the switching network 202 is a signal measurement circuit 204 which can be selectively switched to receive an electrical output signal $E_{out}$ from either piezoelectric element 102A or 102B in response to the applied input signal $E_{in}$ at the other piezoelectric element. By measuring the output signal $E_{out}$ voltage and phase from each piezoelectric element 102A and 102B in a pair, four independent equations are obtained and are used to solve for the four independent parameters (i.e., two independent parameters for each piezoelectric element 102). The only parameters required to be solved for to complete the self- or auto-calibration procedure are the 'g' parameters (voltage coefficients) for each piezoelectric element.

The measured 'g' parameters are used to calculate calibration or "gain" compensation values $G_1$ and $G_2$ for the output voltage for the first and second piezoelectric elements 102A and 102B of a pair in the auto-calibrating transducer assembly 100 according to the following relationships:

$$G_1 = \frac{g1_j}{g1_i} \quad \text{Eqn. 5}$$

$$G_2 = \frac{g2_j}{g2_i} \quad \text{Eqn. 6}$$

where $g1_i$ represents the voltage coefficient for the first piezoelectric element 102A obtained from a previous calibration;

$g1_j$ represents the voltage coefficient obtained for the first piezoelectric 102A element at a later ($j^{th}$) calibration;

$g2_i$ represents the voltage coefficient for the second piezoelectric element 102B obtained from a previous calibration; and $g2_j$ represents the voltage coefficient obtained for the second piezoelectric element 102B at a later ($j^{th}$) calibration.

Once obtained, the values for $G_1$ and $G_2$ are multiplied by the voltage of the output electrical signal $E_{out}$ from the respective first and second piezoelectric elements 102A and 102B during the next or subsequent balance spin procedures to obtain a calibrated output voltage signal.

Determination of the output signal phase compensation or correction value $\theta_1$ or $\theta_2$ for the respective first or second piezoelectric elements 102A and 102B of a pair in the auto-calibration transducer assembly 100 is similarly accomplished as follows, for the simplified case where the auto-calibration frequency is the same as the frequency as the balance spin.

$$\theta_1 = \theta1_i - \theta1_j \quad \text{Eqn. 7}$$

$$\theta_2 = \theta2_i - \theta2_j \quad \text{Eqn. 8}$$

where:

$\theta1_i$ represents the phase measured at the first piezoelectric element 102A obtained from a previous calibration;

$\theta1_j$ represents the phase measured at the first piezoelectric element 102A at a later ($j^{th}$) calibration;

$\theta2_i$ represents the phase measured at the second piezoelectric element 102B obtained from a previous calibration; and $\theta2_j$ represents the phase measured at the second piezoelectric element 102B at a later ($j^{th}$) calibration.

As will be apparent to those of ordinary skill in the art, the auto-calibration procedures may be utilized for quite some time after the initial manual or "hard" calibration procedure for the vehicle wheel balancer, in order to maintain the wheel balancing system in operating condition. A database of the auto-calibration results for each procedure carried out may be maintained and reviewed to identify trends or patterns in changes to the calibration of one or more of the piezoelectric elements 102, enabling identification of failing or broken components within the wheel balancing system.

It will further be apparent to one of ordinary skill in the art that the concepts of the present disclosure can be utilized with vehicle wheel balancer systems employing multiple auto-calibrating transducers 100 having multiple piezoelectric elements 102, or with vehicle wheel balancer systems having only a single piezoelectric element 102 in an auto-calibrating transducer 100. For a system having only a single piezoelectric element 102, the input signal will excite the piezoelectric element, and introduce a resonance vibration or "ringing" of responsive forces in the auto-calibrating transducer. The resulting resonance vibration or "ringing" will generate an electrical output signal $E_{out}$ which can recorded and compared to subsequent electrical output signals during later auto-calibration procedures to adjust a calibration value or identify a potential component failure in the auto-calibrating transducer 100.

The present disclosure can be embodied in-part in the form of computer-implemented processes and apparatuses for practicing those processes. The present disclosure can also be embodied in-part in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense. Those of ordinary skill in the art will readily recognize that the auto-calibration procedures of the present disclosure are not limited to use with the exemplary auto-calibrating piezoelectric transducer assembly 100 shown in the accompanying Figures, and that the same procedures can be utilized with a variety of configurations of piezoelectric transducer assemblies.

The invention claimed is:

1. A method for automatic calibration of a piezoelectric force transducer wherein the force transducer contains at least a pair of piezoelectric elements disposed to measure forces in a common axial direction, comprising:
   applying a first input signal having a voltage component to a first piezoelectric element to generate a first force applied to said second piezoelectric element in said pair, and receiving a first output signal having an associated voltage component and an associated phase from said second piezoelectric element in said pair, said first output signal representative of a response by said second piezoelectric element to said first generated force;
   applying a second input signal to said second piezoelectric element in said pair to generate a second force applied to said first piezoelectric element in said pair, and receiving a second output signal having a second associated voltage component and a second associated phase from said first piezoelectric element in said pair, said second output signal representative of a response by said first piezoelectric element said second generated force;
   wherein said first and second output signals define a set of output signals; and
   evaluating said set of output signals to establish compensation values for calibrating subsequent output signals from said first and second piezoelectric elements.

2. The method of claim 1 wherein said first and second input signals are identical.

3. The method of claim 1 wherein the steps of applying said first and second input signals to said first and second piezoelectric elements are repeated at least once to record at least one subsequent set of output signals;
   wherein said step of evaluating includes comparing said at least one subsequence set of output signals to at least one previous set of output signals to identify signal deviations; and
   wherein said compensation values for calibrating said output signals from said first and second piezoelectric elements are responsive to said identified signal deviations.

4. The method of claim 3 wherein identifying signal deviations between said sets of output signals includes establishing compensation values $G_1$ and $G_2$ for said first and second piezoelectric force elements respectively, according to:

$$G_1 = \frac{g1_j}{g1_i}$$

and $$G_2 = \frac{g2_j}{g2_i}$$

where
   $g1_i$ represents an output voltage signal for the first piezoelectric element obtained from a first calibration;
   $g1_j$ represents an output voltage signal obtained for the first piezoelectric element at a second calibration;
   $g2_i$ represents an output voltage signal for the second piezoelectric element obtained from said first calibration; and
   $g2_j$ represents an output voltage signal obtained for the second piezoelectric element at said second calibration.

5. The method of claim 3 wherein identifying signal deviations between said sets output signals includes establishing compensation values $\theta_1$ and $\theta_2$ for said first and second piezoelectric elements respectively, according to:

$$\theta_1 = \theta1_i - \theta1_j,$$

and $$\theta_2 = \theta2_i - \theta2_j,$$

where:
   $\theta1_i$ represents a phase output signal at the first piezoelectric element obtained from a first calibration procedure;
   $\theta1_j$ represents a phase output signal at the first piezoelectric element at a second calibration procedure;
   $\theta2_i$ represents a phase output signal at the second piezoelectric element obtained from said first calibration procedure; and
   $\theta2_j$ represents a phase output signal at the second piezoelectric element at said second calibration procedure.

6. The method of claim 1 wherein steps of applying input signals to said first and second piezoelectric elements and said step of evaluating are carried out automatically as an automatic calibration.

7. A transducer assembly for a vehicle wheel balancer system, comprising:
   a plurality of piezoelectric sensor elements, one or more of said piezoelectric sensor elements configured to receive vibrations associated with the rotation of a vehicle wheel assembly undergoing imbalance measurement by the vehicle wheel balancer;
   wherein a first piezoelectric sensor element in said plurality of sensor elements is configured to exert an output force along a measurement axis in response to an applied input electrical signal having a voltage and a phase;
   wherein a second piezoelectric sensor element in said plurality of sensor elements is configured to generate an output electrical signal having a second voltage and a second phase in response to said output force exerted by said first piezoelectric sensor element along said common measurement axis.

8. An auto-calibrating piezoelectric force transducer assembly, comprising:
   a plurality of piezoelectric elements;
   a first piezoelectric element in said plurality of piezoelectric elements responsive to forces applied along a measurement axis to generate a first output electrical signal;
   an electronic switching network operatively coupled to said first piezoelectric element, said electronic switching network configured to convey input electrical signals having a voltage and a phase to said first piezoelectric element, and to receive out electrical signals there from;

said second piezoelectric element in said plurality of piezoelectric elements responsive to said forces applied along said measurement axis to generate a second output electrical signal;

said electronic switching network operatively coupled to said second piezoelectric element, said second electronic switching network configured to convey input electrical signals having a voltage and a phase to said second piezoelectric element, and to receive output electrical signals there from; and wherein each of said first and second piezoelectric elements are discretely responsive to an independently applied input electrical signal from said switching network to generate an associated responsive force along said measurement axis which results in an associated output electrical signal produced by the other of said first and second piezoelectric elements, said associated output electrical signal representative of a piezoelectric element response to said applied input electrical signal.

9. The auto-calibrating piezoelectric force transducer assembly of claim 8 wherein said first and second piezoelectric elements are piezo-ceramic elements.

10. An improved vehicle wheel balancer system having a rotating structure for mounting a vehicle wheel assembly, and a processing system configured to measure imbalance of said vehicle wheel assembly, the improvement comprising:

at least one transducer assembly disposed within said vehicle wheel balancer system to measure vibrations associated with a vehicle wheel undergoing an imbalance measurement procedure;

wherein said at least one transducer assembly is an auto-calibrating piezoelectric force transducer assembly having a plurality of piezoelectric elements including a first piezoelectric element responsive to forces applied along a measurement axis to generate a first output electrical signal and a second piezoelectric element responsive to said forces applied along said measurement axis to generate a second output electrical signal, each of said first and second piezoelectric elements discretely responsive to an independently applied input electrical signal having a voltage and a phase to generate a responsive output force along said measurement axis; and wherein said processing system is configured to independently communicate said input signal to said first and second piezoelectric elements of said at least one transducer assembly to generate an associated force along said measurement axis, and to receive an output signal from the other of said first and second piezoelectric elements responsive to said associated force along said measurement axis, during an auto-calibration procedure for said transducer assembly.

11. A method for automatic compensation of a piezoelectric force transducer in a vehicle wheel balancer system having a processing system operatively coupled to the piezoelectric force transducer, and wherein the force transducer contains at least a pair of piezoelectric elements operatively disposed to measure forces on a common axis, comprising:

applying a first input electrical signal having a voltage and a phase to a first piezoelectric element to generate a first force, and receiving at said processing system, a first output electrical signal from said second piezoelectric element in said pair, said first output signal having a voltage and a phase representative of a response to said first generated force by said second piezoelectric element;

applying a second input electrical signal having a voltage and a phase to said second piezoelectric element in said pair to generate a second force, and receiving at said processing system, a second output electrical signal from said first piezoelectric element in said pair, said second output signal having a voltage and a phase representative of a response to said second generated force by said first piezoelectric element;

wherein said first and second output electrical signals from said first and second piezoelectric elements define a set of output electrical signals; and evaluating said set of output electrical signals to establish compensation values for calibrating an output of said first and second piezoelectric elements by comparing said set of output signals with stored calibration signals.

12. The method of claim 11 wherein said compensation values for calibrating said output of said first and second piezoelectric elements are established in response to identified deviations between said set of output electrical signals and said stored set of calibration signals.

13. The method of claim 11 wherein said set of output electrical signals are stored by the processing system as said set of calibration signals after said evaluation step.

14. The method of claim 13 further including the step of reviewing said calibration signals to identify at least one condition associated with said first and second piezoelectric elements, said at least one condition including, but not limited to, a change in calibration or a trend in calibration changes.

15. The method of claim 11 further including the step of storing said set of output electrical signals from each automatic compensation procedure, said set of stored output electrical signals providing a history of calibration adjustments to said first and second piezoelectric elements.

16. A method for automatic compensation of a pair of piezoelectric force transducers in a vehicle wheel balancer system having a processing system operatively coupled to the pair of piezoelectric force transducers, and wherein each piezoelectric force transducer contains a single piezoelectric element operatively disposed to measure forces along at least one axis, comprising:

applying, from the processing system, an input electrical signal having a voltage and a phase to a first piezoelectric force transducer selected to generate a first force in the associated piezoelectric element, and receiving at said processing system, an output electrical signal having a voltage and a phase from said second piezoelectric force transducer, said output electrical signal representative of said first generated force as measured at said second piezoelectric force transducer;

applying a second input electrical signal having a voltage and a phase to said second piezoelectric force transducer to generate a second force in the associated piezoelectric element, and receiving at said processing system, a second output electrical signal having a voltage and a phase from said first piezoelectric force transducer, said output electrical signal representative of said second generated force as measured at said first piezoelectric force transducer;

wherein said output electrical signals from said first and second piezoelectric force transducers define said a set of output electrical signals; and evaluating said set of output electrical signals to establish compensation values for calibrating an output of said first and second piezoelectric force transducers by comparing said set of output electrical signals with stored calibration signals.

17. A method for automatic calibration of wheel balancer force transducer during a period when the wheel balancer is not in use measuring the imbalance of a rotating wheel assembly, the transducer including at least a first and a second piezoelectric element and a processing system operatively coupled to send signals to, and receive signals from, said first and second piezoelectric elements, comprising generating, at said processing system an input electrical signal for transmission to said first piezoelectric element;

transmitting said input electrical signal having a voltage and a phase to said first piezoelectric element through a switching network, said first piezoelectric element exerting a force in response to said input electrical signal;

receiving said exerted force at said second piezoelectric element within said transducer;

generating, at said second piezoelectric element, an output electrical signal responsive to said received force;

transmitting said output electrical signal to said processing system through a switching network; and wherein said processing system determines a calibration value for said transducer responsive to at least said output electrical signal.

* * * * *